United States Patent [19]

Spears

[11] Patent Number: 5,595,419
[45] Date of Patent: Jan. 21, 1997

[54] SEGMENTED AIR DEFLECTOR ASSEMBLY

[76] Inventor: Dan E. Spears, 3515 Westfield Dr., Brandon, Fla. 33511

[21] Appl. No.: 352,515

[22] Filed: Dec. 9, 1994

[51] Int. Cl.⁶ .................................................. B62D 35/00
[52] U.S. Cl. ...................... 296/180.2; 296/180.1
[58] Field of Search ............................. 296/180.1–180.5; 180/903

[56] References Cited

U.S. PATENT DOCUMENTS

| | | | |
|---|---|---|---|
| 1,573,086 | 2/1926 | Miller et al. | 296/85 |
| 3,309,131 | 3/1967 | Saunders | 296/180.2 |
| 3,695,673 | 10/1972 | Meadows | 296/180.2 |
| 4,313,635 | 2/1982 | Front | 296/180.3 |
| 4,693,506 | 9/1987 | Massengill | 296/180.3 |
| 4,824,165 | 4/1989 | Fry | 296/180.5 X |
| 4,883,307 | 11/1989 | Hacker et al. | 296/180.2 |
| 4,957,322 | 9/1990 | Marlowe et al. | 296/180.2 |

*Primary Examiner*—Dennis H. Pedder

[57] ABSTRACT

A segmented air deflector for attachment to a tractor, the segmented air deflector formed of numerous sections, each section relatively planar or level, with sharp definable lines separating adjacent sections. The segmented design to straighten the swirling of the turbulent wash of air flowing over and past the vehicles forward surfaces, by changing the pressure of the air flow as it conforms to the angularly changing surfaces of the segmented air deflector. Segmented upper panels and segmented lower panels having the same air flow smoothing features are taught. Additionally standardized components are disclosed to form segmented air deflectors have various longitudinal lengths for specific installation requirements.

9 Claims, 6 Drawing Sheets

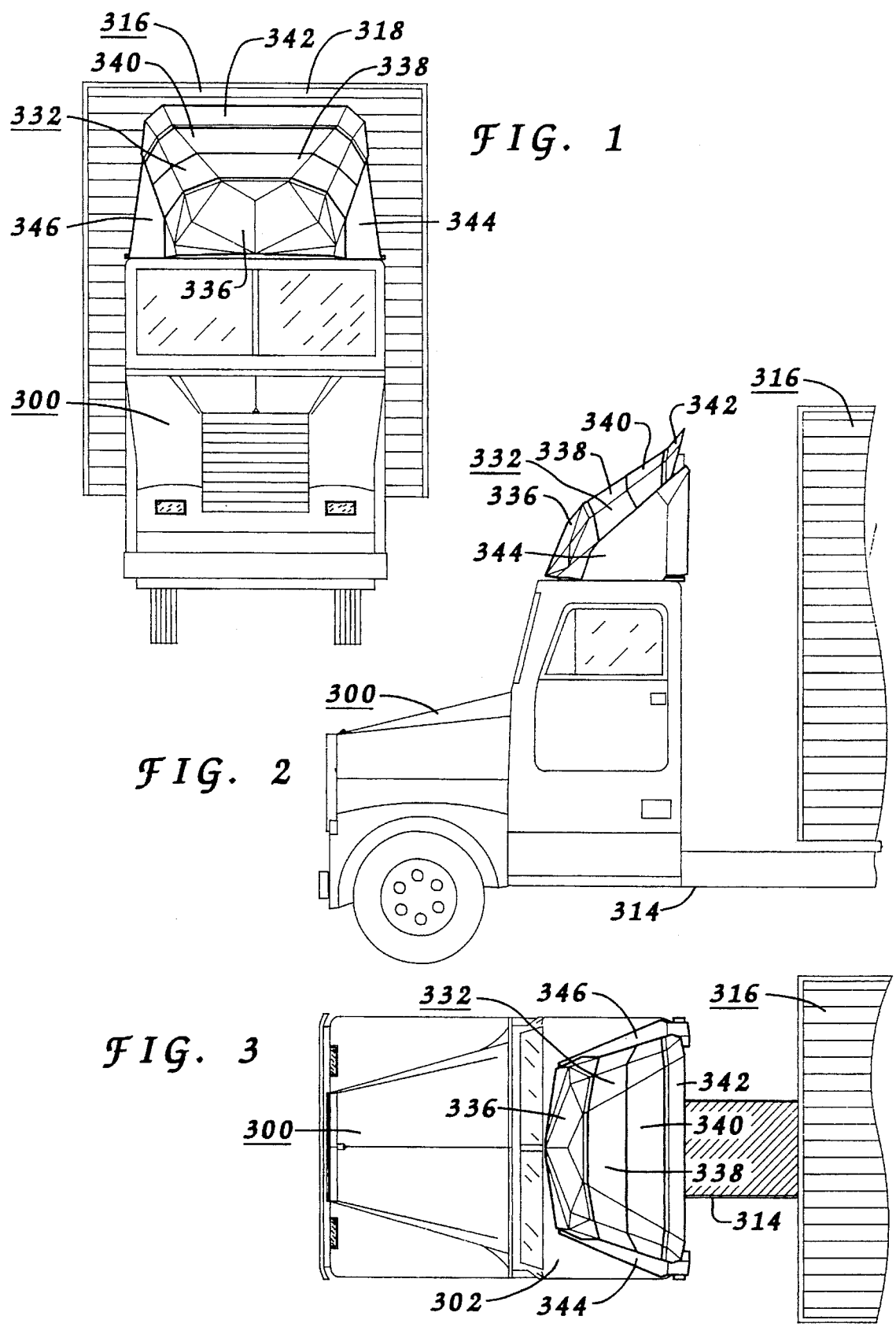

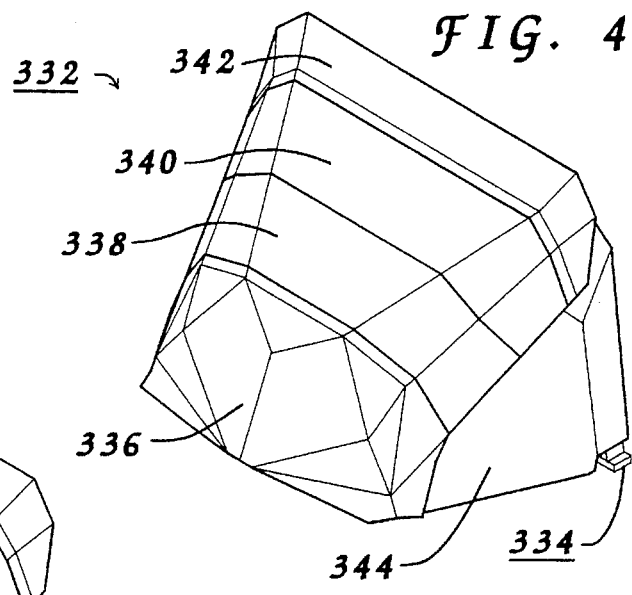
FIG. 4
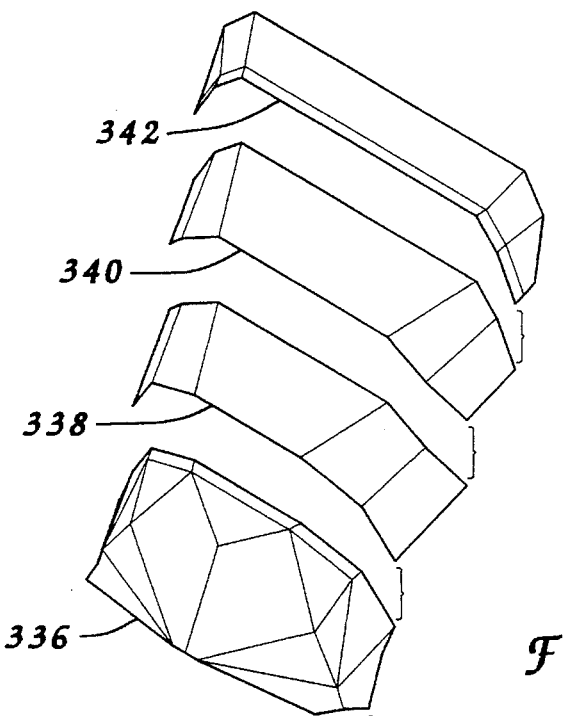
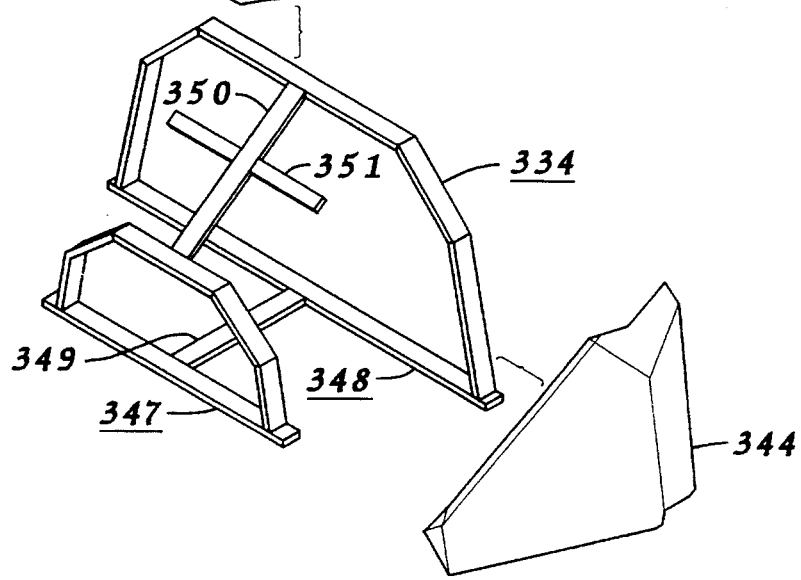
FIG. 5

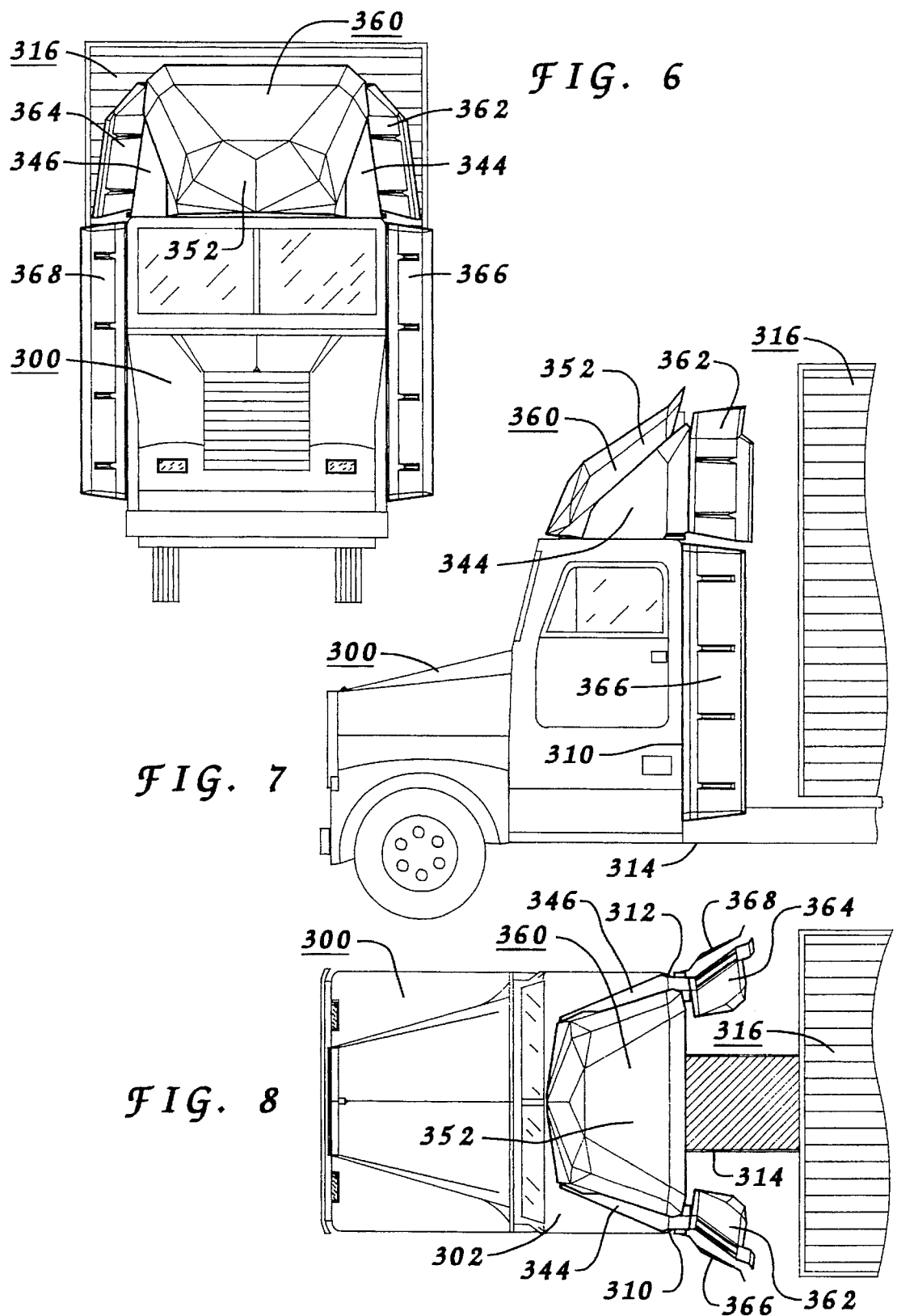

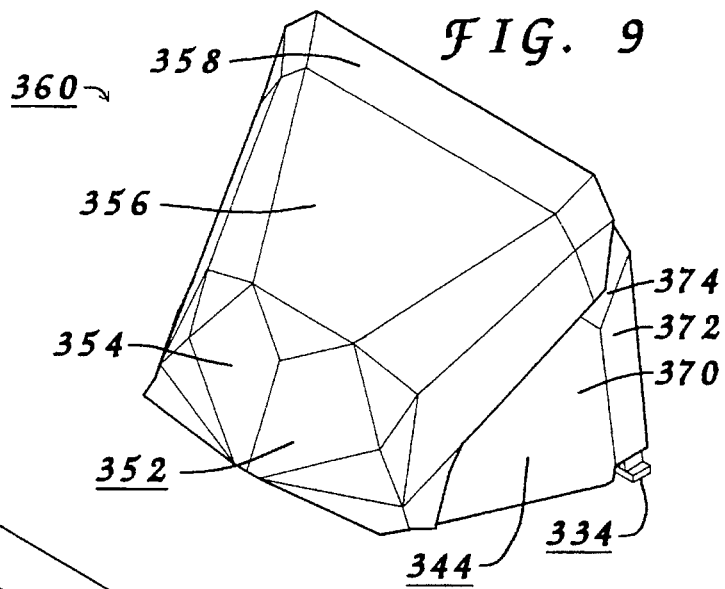
FIG. 9
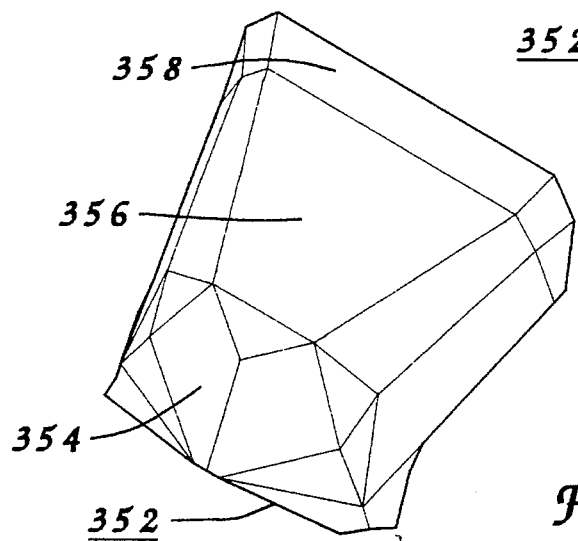
FIG. 10
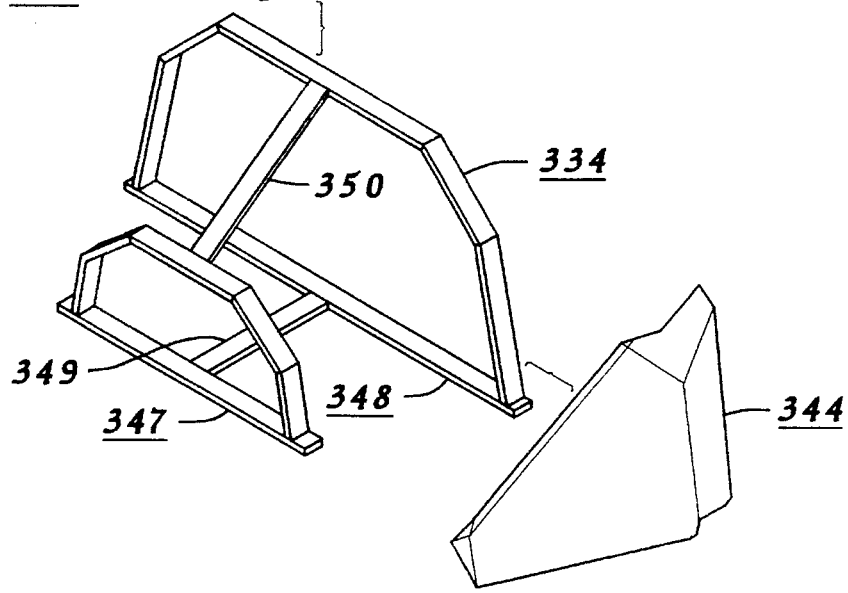

SEGMENTED AIR DEFLECTOR ASSEMBLY

BACKGROUND

1. Field of the Invention

This invention relates to reducing the turbulent wash of disturbed air caused by the air flowing over the forward surfaces of the tractor of a tractor trailer combination for more controlled deflection around the trailer.

2. Description of the Prior Art

Generally, fairings are comprised of a single shell constructed of either fiberglass or a metal alloy and attached to the top of the roof of the tractor. These units are usually specifically designed to be installed on a particular model of tractor. When the fairing is damaged during usage, such as cracked or otherwise deformed, repairs are difficult. Replacement of the entire shell is generally required. Additionally the single shell unit is difficult to transport during the distribution phase following manufacture, as the unit is large, bulky and rigid.

Numerous attempts have been made to provide fairings to streamline air flow around the trailer. Your applicant is unaware of the use of segmented surfaces in a fairing design.

As such, it may be appreciated that there continues to be a need for a segmented air deflector. Additionally there exists a need for an air deflector versatile enough to fulfill multiple tasks yet adaptable for transport in a small crate and assembled at the location of installation. The present invention substantially fulfills these needs.

SUMMARY

In view of the foregoing disadvantages inherent in the known types of fairings, the present invention provides for a plurality of segmented surfaces defined by sharp edges, each surface relatively planar or level. The sudden angular changes cause a change in the pressure of the air that is moving across the surfaces. This change in pressure is caused by the air flow attempting to conform to the surfaces which are defined by the sudden angular changes. This results in an uncurling and straightening of the air flow. These segmented surfaces would be contained on a one piece fairing or a fairing constructed of individual panels connected to a frame system.

Optional left and right segmented upper side panels are attached to the horizontal sides of the segmented air deflector. The left and right segmented upper side panels each have an outward sweeping trailing edge. These trailing edges further direct the air flow around the upper section of the facing horizontal front of the trailer to streamline the combination to reduce drag.

Optional left and right segmented lower side panels are attached to the trailing edges of the tractor. The left and right segmented lower side panels each have an outward sweeping trailing edge. These trailing edges further direct the air flow around the lower section of the facing horizontal front of the trailer to streamline the combination to reduce drag.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposed of the present invention. It is important, therefore, that the claims be regarded as including such equivalent constructions insofar as they do not depart from the spirit and scope of the present invention.

It is therefore an object of the present invention to provide a segmented air deflector formed of a frame system and various segmented panels, the segmented panels forming substantially the entire exterior surface of the segmented air deflector.

Yet another object of the present invention is to provide for the panels to be segmented, or formed of substantially flat level areas with sharp definable lines between the various areas, to change the swirling of turbulent wash of air flowing over and past the vehicles forward surface, to further enhance air flow control, increase strength and ensure aesthetic appeal.

It is another object of the present invention to provide for ease of distribution of the segmented air deflector by allowing for assembly of the segmented air deflector at the location of installation.

It is a further object of the present invention to allow for ease of repair to a damaged segmented air deflector by having the entire exterior surface formed of the various segmented panels, such repair comprising the physical repair of the effected panel or its selective replacement.

An even further object of the present invention is to provide three separate panel groups, being the segmented air deflector, the left and right upper panels and the left and right lower panels. This variety will permit varied installation depending upon the configuration of the particular tractor and the envisioned trailers employed with the particular tractor.

Still another object of the present invention is to provide for a one piece segmented air deflector sized for specific installations.

It is a further object of the present invention to permit after installation retro fitting of mechanical structural elements to provide for selective movement of various panels of the system for specific air flow redirection purposes.

An even further object of the present invention is to provide for the various panels to mate together to provide as smooth a surface as possible providing the least drag possible.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 1 is a front plan view of a segmented air deflector mounted on a tractor with a trailer attached.

FIG. 2 is a side plan view of the illustration of FIG. 1.

FIG. 3 is a top plan view of the illustration of FIG. 1 and FIG. 2.

FIG. 4 is a perspective view of the segmented air deflector illustrated in FIG. 1, FIG. 2 and FIG. 3.

FIG. 5 is an exploded perspective view of the illustration of FIG. 4.

FIG. 6 is a front plan view of a second embodiment of a segmented air deflector, opposing upper panels and opposing lower panels mounted on a tractor with a trailer attached.

FIG. 7 is a side plan view of the illustration of FIG. 6.

FIG. 8 is a top plan view of the illustration of FIG. 6 and FIG. 7.

FIG. 9 is a perspective view of the segmented air deflector illustrated in FIG. 6, FIG. 7 and FIG. 8.

FIG. 10 is an exploded perspective view of the illustration of FIG. 9.

DESCRIPTION OF THE PREFERRED EMBODIMENT

Figure 11:
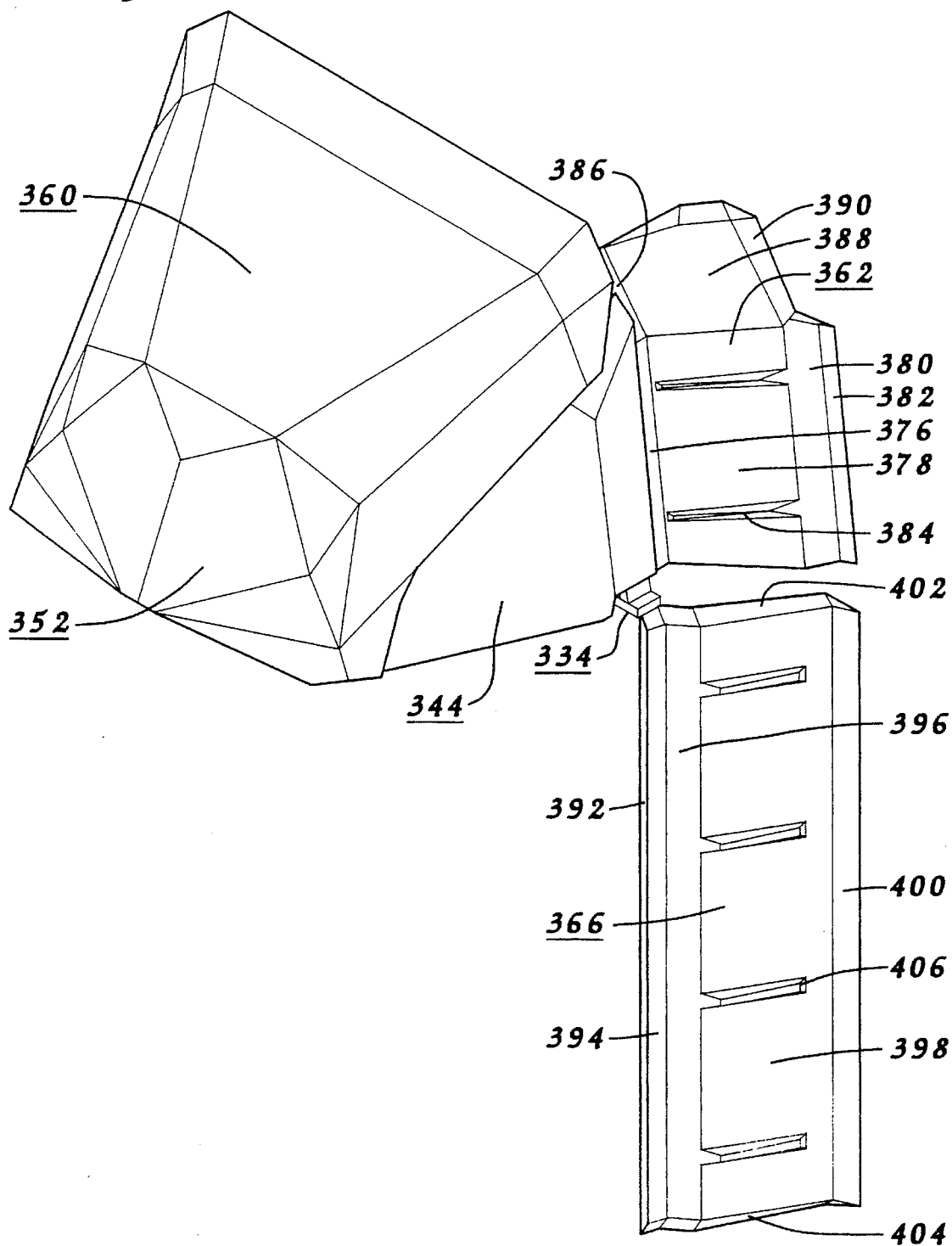
FIG. 11 is an enlarged perspective view of the system components illustrated in FIG. 6, FIG. 7 and FIG. 8.

Referring now to the drawings where like reference numerals refer to like parts throughout the various views, and specifically referring to FIG. 1 through FIG. 5, a segmented air deflector 332 is illustrated. FIG. 1 through FIG. 3 show segmented air deflector 332 attached to roof area 302 of tractor 300, utilizing any conventional method known in the art. Tractor 300 is adaptable to transport a trailer 316 utilizing a connection member 314. Segmented air deflector 332 acts as a fairing to redirect air flow encountered by tractor 300 and trailer 316 during forward motion around forward face 318 of trailer 316. A frame system 334 is formed of a front frame assembly 347 and a rear frame assembly 348 connected one to the other by a lower cross member 349 and an upper cross member 350. Upper cross member 350 has attached thereto a cross member 351. Frame system 334 is preferably formed of metal framing fastened together by a conventionally known method such as brackets and screws, bolts or rivets. Secured to frame system 334 is a front panel 336, a first panel 338, a second panel 340 with a spoiler panel 342 secured thereto, a left side panel 344 and a right side panel 346. First panel 338, second panel 340 or their equivalents, which transverse the segmented air deflectors, are also referred to as transversal panels or doors. While specifically referred to herein as being rigidly affixed to the various frames, optionally the transversal panels may be pivotally mounted and act as doors for various air flow redirection purposes. FIG. 5 shows the spacial relationship of the various panels relative to frame system 334. It being understood that right side panel 346 has been eliminated from this view for illustrative purposes. Securement of the various panels is accomplished by any of the numerous methods known in the art, with a particularly expedient method being brackets and screws, bolts or rivets. It being noted that front panel 336, first panel 338, second panel 340 and spoiler panel 342 overlie the front and upper edges of left side panel 344 and right side panel 346. Thus, the principle of segmented sections to form the exterior of segmented air deflector 332 is clearly demonstrated. It being noted that each section has a relatively gradual angular change to the following section. Air flowing over such sections during transport of tractor 300 and trailer 316 will attempt to conform to the following section. Such conforming resulting in a smoothing of the turbulent wash of the air flow created by the forward surfaces of tractor 300. This smoothing results in better control of the air flow for more efficient redirection around forward face 318 of trailer 316. It being noted that this basic principle applies to the various embodiments of segmented air deflectors disclosed herein or designed upon the principles described herein, FIG. 6 through FIG. 11 illustrate a segmented air deflector 360 in various view with attachment to tractor 300 shown in FIG. 6 through FIG. 8. Segmented air deflector 360 is comprised of left side panel 344, right side panel 346 and segmented panel 352 secured to frame system 334. Frame system 334 is comprised of front frame assembly 347, rear frame assembly 348, lower connection member 349 and upper connection member 350. Segmented panel 352 is a one piece panel having definable sections being a forward section 354, an intermediate section 356 and an upturned section 358. The various panels are secured to frame system 334 as previously disclosed. It being noted that segmented panel 352 has a depth, if laid flat, significantly less than the height of segmented air deflector 360. It further being noted that the other unassembled components, including the unassembled frame system 334, have relatively minor depths. Therefore shipment is possible in a relatively small crate with assembly and installation taking place at a location other than the location where the components were formed. Attached to the rearward edges of segmented air deflector 360, on opposing sides, are a left upper panel 362 and a right upper panel 364. Depending upon the particular tractor trailer combination, left upper panel 362 and right upper panel 364 could be mounted to segmented air deflector 360 at positions forward from the trailing edge. One such occasion could be for installation on a tractor trailer combination having a rigid permanent connection that is not pivotal, with the resulting elimination of the clearance factor. Attached to tractor 300 in close proximity to left rear vertically oriented trailing 310 edge of tractor 300 is a left lower panel 366. Attached to tractor 300 in close proximity to right rear vertically oriented trailing 312 edge of tractor 300 is a right lower panel 368. The respective upper panels 362 and 364 and the respective lower panels 366 and 368 are rigidly attached at a desired angular offset depending upon the particular tractor trailer combination and any associative clearance requirement, such as required for turning. These panels act to redirect the air flow around trailer 316 to reduce drag. FIG. 11 demonstrates the orientation and configuration of the upper and lower panels in more particular detail. It being noted that right upper panel 364, right lower panel 368, tractor 300 and trailer 316 have been eliminated for illustrative purposes. Segmented air deflector 360, left upper panel 362 and left lower panel 366 are shown in spacial relationship based on the preferred installation, as illustrated in FIG. 6 through FIG. 8. Left upper panel 362 is comprised of various surfaces which are all relatively planar and are definable from adjacent surfaces by sharp defining lines with a definable angular offset between the adjacent surfaces. A front conditioning surface 376 terminates rearward with a primary surface 378 and upward with an upper conditioning surface 386. Primary surface 378 has extending outward therefrom conditioning risers 384 which act to straighten the air flow which passes over primary surface 378. Primary surface 378 terminates rearward with a rear conditioning surface 380 which recedes inward causing the air flow passing over primary surface 378 to attempt to conform to the sudden surface change. Rear conditioning surface 380 then terminates rearward with a sweeping trailing edge 382 which forces the conditioned air flow passing over left upper panel 362 outward and around forward face 318 of trailer 316, shown in FIG. 6 through FIG. 8. Upper conditioning surface 386 terminates rearward with an upper primary surface 388. Upper primary surface 388 terminates rearward and upward with an upper sweeping trailing edge 390. Upper sweeping trailing edge 390 acts to further divert the air flow outward and upward around forward face 318 of trailer 316, shown in FIG. 6 through FIG. 8. Left lower panel 366 is similarly comprised of various surfaces which are all relatively planar and are definable from adjacent surfaces by sharp defining lines with a definable angular offset between the adjacent surfaces. A connection edge 392 permits attachment to tractor 300, shown in FIG. 6 through FIG. 8, utilizing any of the conventional attachment means known in the art. A first conditioning surface 394 terminates rearward with a second conditioning surface 396. Second conditioning surface 396 terminates rearward with a primary surface 398 with primary surface 398 receding inward from second conditioning surface 396. This sudden angular change causes the passing air flow to attempt to conform to the sudden surface change, with a resulting reduction of turbulence within the air flow. Conditioning risers 406 extend outward from primary surface 398 and act to straighten the air flow which passes over primary surface 398, with a resulting reduction of turbulence within the air flow. Primary surface 398 terminates rearward with a sweeping trailing edge 400 which acts to further divert the air flow outward around forward face 318 of trailer 316, shown in FIG. 6 through FIG. 8. An upper edge 402 and a lower edge 404 extend inward from the other surfaces of left lower panel 366 to provide a lessening of turbulence of air flow disturbed by the upper and lower edges of left lower panel 366. While the respective upper panels 362 and 364 and the respective lower panels 366 and 368 are illustrated rigidly attached, the option exists to initially mount the respective panels to be selectively pivotal. Additionally the option exists to later retro fit existing rigid installation with structural mechanisms to permit the respective panels to be selectively pivotal. Such pivotal operation permitting selective air flow redirection for various purposes.

Figure 12:
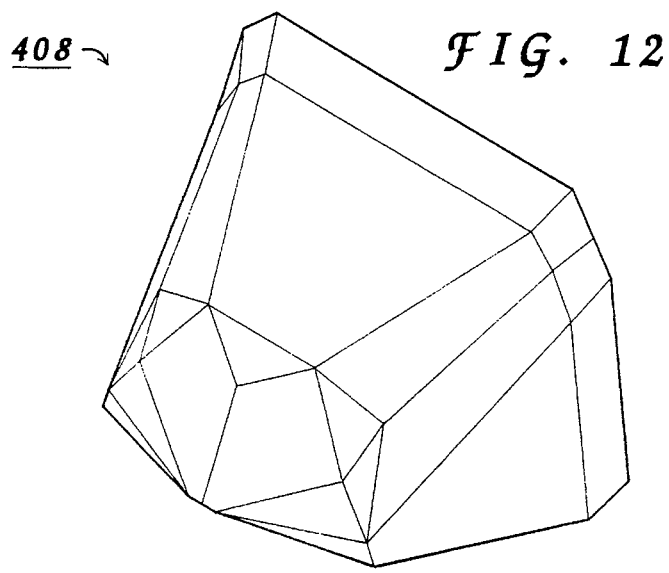
FIG. 12 is a perspective view of another embodiment of a segmented air deflector.

FIG. 12 shows a one piece segmented air deflector 408. Segmented air deflector 408 would preferably be formed in a mold as conventionally known in the art.

Figure 13:
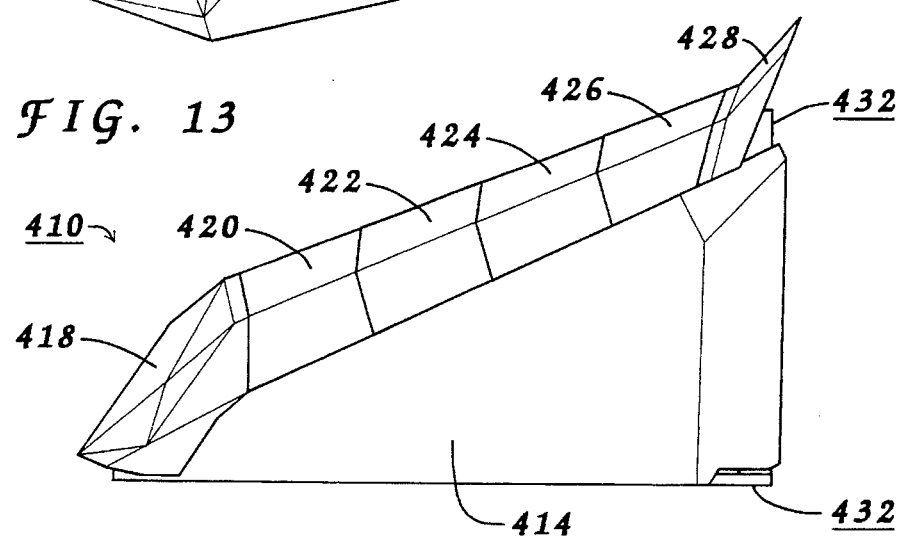
FIG. 13 is a side plan view of another embodiment of a segmented air deflector.
Figure 14:
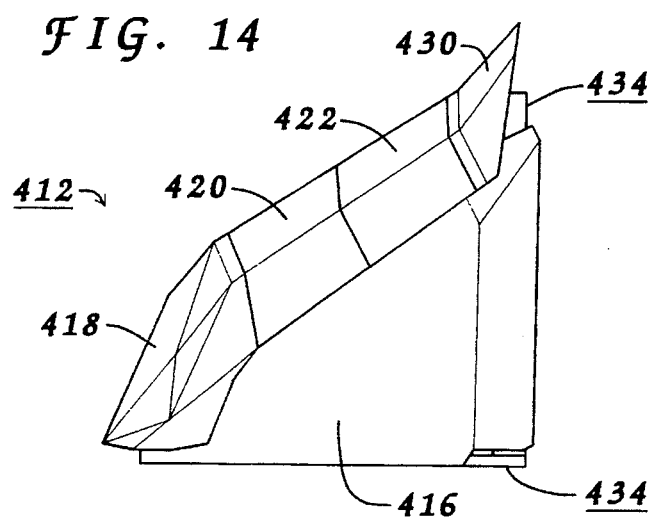
FIG. 14 is a side plan view of another embodiment of a segmented air deflector.

FIG. 13 and FIG. 14 illustrate the versatility of the panel system used to construct the various segmented air deflectors 410 and 412. A front panel 418, a first panel 420 and a second panel 422 are used for both segmented air deflector 410 and segmented air deflector 412.

FIG. 13 shows segmented air deflector 410 having a longitudinal length sufficient for installation on a tractor having a sleeper compartment. Front panel 418 is rigidly attached to frame system 432. First panel 420 and second panel 422 are attached to frame system 432. Within this embodiment a third panel 424, a fourth panel 426, with a spoiler panel 428 rigidly attached thereto, are attached to frame system 432. A left side panel 414 is rigidly attached to frame system 432. It being understood that the right side of segmented air deflector 410 similarly has a panel rigidly attached thereto.

FIG. 14 shows segmented air deflector 412 having a longitudinal length sufficient for installation on a standard tractor not having a sleeper compartment. Front panel 418 is rigidly attached to frame system 434. First panel 420 and second panel 422, with a spoiler panel 430 rigidly attached thereto, are attached to frame system 434. A left side panel 416 is rigidly attached to frame system 434. It being understood that the right side of segmented air deflector 412 similarly has a panel rigidly attached thereto.

Thus it is understood that by having standardized panels various segmented air deflectors can be assembled for specific installations. While two and four panels have been used for illustrative purposes, other specific numbers are possible. The longitudinal length of the frame member may be varied while retaining uniformly sized front members and rear members.

Various materials may be used to form the individual panels utilizing any method known in the art. A particularly expedient method utilizes molds to form the panels from a resin reinforced by fiberglass sheet material. The resulting panels are strong, lightweight, easily drilled for attachment, will not rust and have a resulting exterior surface that is easy to paint. The number of separate molds to provide installation of two, three or four panel or door units, given for example and not limitation, requires fourteen molds. One mold for the universal front panel, four separate molds for the transversal panels, three separate molds for the three possible spoiler panels, and six separate molds for the three possible pairs of side panels. Additionally four separate molds are required for the opposing upper panels and the opposing lower panels.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling with the scope of the invention.

I claim:

1. A segmented air deflector for a tractor, the tractor having a roof area, a direction of forward travel from which directional orientations are derived, a left side, a right side, a left rear vertically oriented trailing edge and a right rear vertically oriented trailing edge, the tractor to tow a trailer, the tractor and the trailer forming a tractor trailer combination, the segmented air deflector attachable to the roof area of the tractor and having a directional orientation following attachment, the directional orientation including left, right, forward and rear all corresponding to the directional orientations of the tractor, the segmented air deflector comprising a continuous shell having a left lower edge, a forward transversal edge, a right lower edge all in close proximity to the tractor roof following installation, the continuous shell having an exterior surface having a left side terminating rearward with a left rear trailing edge and a right side terminating rearward with a right rear trailing edge, an intermittent section extending rearward and upward between and contacting the left side and the right side, the intermittent section having a transversal direction extending between the left side and the right side and a longitudinal direction extending rearward and upward, the transversal direction separated into a plurality of surface sections, each surface section level and planar and defined from adjacent surface sections by sharp edges, the exterior surface of the segmented air deflector forming a continuous segmented surface area to provide fairing characteristics to stream line air flow around the trailer during motion of the tractor trailer combination to reduce drag.

2. The segmented air deflector defined in claim 1 further comprising:

a) a right upper panel having a plurality of surface sections, each surface section level and planar and defined from adjacent surface sections by sharp edges, the right upper panel attached in close proximity to the right rear trailing edge of the segmented air deflector;

b) a left upper panel having a plurality of surface sections, each surface section level and planar and defined from adjacent surface sections by sharp edges, the left upper panel attached in close proximity to the left rear trailing edge of the segmented air deflector;

the right upper panel and left upper panel to redirect air flow around the trailer to reduce drag.

3. The segmented air deflector defined in claim 2 further comprising:

a) a right lower panel having a plurality of surface sections, each surface section level and planar and defined from adjacent surface sections by sharp edges, the right lower panel attached in close proximity to the right vertically oriented trailing edge of the tractor;

b) a left lower panel having a plurality of surface sections, each surface section level and planar and defined from adjacent surface sections by sharp edges, the left lower panel attached in close proximity to the left rear vertically oriented trailing edge of the tractor;

the right and left lower panels to redirect air flow around the trailer to reduce drag.

4. A segmented air deflector for a tractor, the tractor having a roof area, a direction of forward travel from which directional orientations are derived, a left side, a right side, a left rear vertically oriented trailing edge and a right rear vertically oriented trailing edge, the tractor to tow a trailer, the tractor and the trailer forming a tractor trailer combination, the segmented air deflector attachable to the roof area of the tractor and having a directional orientation following attachment, the directional orientation including left, right, forward and rear all corresponding to the directional orientations of the tractor, the segmented air deflector comprising:

a) a frame system;

b) a segmented panel rigidly attached to the frame system, substantially forming a front and a top of the segmented air deflector and having an exterior surface, the exterior surface formed of a plurality of surface sections extending both from left to right and forward to rear, each surface section level and planar and defined from adjacent surface sections by sharp edges;

c) a right side segmented panel rigidly attached to the frame system and substantially filling the area between the segmented panel and the tractor on the right side of the segmented air deflector, the right side segmented panel having an exterior surface formed by at least one level planar surface section;

d) a left side segmented panel rigidly attached to the frame system and substantially filling the area between the segmented panel and the tractor on the left side of the segmented air deflector, the left side segmented panel having an exterior surface formed by at least one level planar surface section;

the segmented panel, the right side segmented panel and the left side segmented panel cooperating to form a segmented surface area to provide fairing characteristics to stream line air flow around the trailer during motion of the tractor trailer combination to reduce drag.

5. The segmented air deflector defined in claim 4 further comprising:

a) a right upper panel having a plurality of surface sections, each surface section level and planar and defined from adjacent surface sections by sharp edges, the right upper panel attached in close proximity to the right rear trailing edge of the segmented air deflector;

b) a left upper panel having a plurality of surface sections, each surface section level and planar and defined from adjacent surface sections by sharp edges, the left upper panel attached in close proximity to the left rear trailing edge of the segmented air deflector;

the right upper panel and left upper panel to redirect air flow around the trailer to reduce drag.

6. The segmented air deflector defined in claim 5 further comprising:

a) a right lower panel having a plurality of surface sections, each surface section level and planar and defined from adjacent surface sections by sharp edges, the right lower panel attached in close proximity to the right vertically oriented trailing edge of the tractor;

b) a left lower panel having a plurality of surface sections, each surface section level and planar and defined from adjacent surface sections by sharp edges, the left lower panel attached in close proximity to the left rear vertically oriented trailing edge of the tractor;

the right and left lower panels to redirect air flow around the trailer to reduce drag.

7. A segmented air deflector for a tractor, the tractor having a roof area, a direction of forward travel from which directional orientations are derived, a left side, a right side, a left rear vertically oriented trailing edge and a right rear vertically oriented trailing edge, the tractor to tow a trailer, the tractor and the trailer forming a tractor trailer combination, the segmented air deflector attachable to the roof area of the tractor and having a directional orientation following attachment, the directional orientation including left, right, forward and rear all corresponding to the directional orientations of the tractor, the segmented air deflector comprising:

a) a frame system;

b) a front segmented panel rigidly attached to the frame system, substantially forming the front of the segmented air deflector and having an exterior surface, the exterior surface formed of a plurality of surface sections, each surface section level and planar and defined from adjacent surface sections by sharp edges;

c) a plurality of segmented panels, each segmented panel attached to the frame system and having an exterior surface, the exterior surface formed of a plurality of surface sections extending from left to right, each surface section level and planar and defined from adjacent surface sections by sharp edges;

d) a right side segmented panel rigidly attached to the frame system and substantially filling the area between the segmented panel and the tractor on the right side of the segmented air deflector, the right side segmented panel having an exterior surface formed by at least one level planar surface section;

e) a left side segmented panel rigidly attached to the frame system and substantially filling the area between the segmented panel and the tractor on the left side of the segmented air deflector, the left side segmented panel having an exterior surface formed by at least one level planar surface section;

the front segmented panel, the plurality of segmented panels, the right side segmented panel and the left side segmented panel cooperating to form a segmented surface area to provide fairing characteristics to stream line air flow around the trailer during motion of the tractor trailer combination to reduce drag.

8. The segmented air deflector defined in claim 7 further comprising:

a) a right upper panel having a plurality of surface sections, each surface section level and planar and defined from adjacent surface sections by sharp edges, the right upper panel attached in close proximity to the right rear trailing edge of the segmented air deflector;

b) a left upper panel having a plurality of surface sections, each surface section level and planar and defined from adjacent surface sections by sharp edges, the left upper panel attached in close proximity to the left rear trailing edge of the segmented air deflector;

the right upper panel and left upper panel to redirect air flow around the trailer to reduce drag.

9. The segmented air deflector defined in claim 8 further comprising:

a) a right lower panel having a plurality of surface sections, each surface section level and planar and defined from adjacent surface sections by sharp edges, the right lower panel attached in close proximity to the right vertically oriented trailing edge of the tractor;

b) a left lower panel having a plurality of surface sections, each surface section level and planar and defined from adjacent surface sections by sharp edges, the left lower panel attached in close proximity to the left rear vertically oriented trailing edge of the tractor;

the right and left lower panels to redirect air flow around the trailer to reduce drag.

* * * * *